United States Patent [19]

Bowes

[11] 3,716,596
[45] Feb. 13, 1973

[54] ALKYLATION AND DEALKYLATION OF AROMATICS IN THE PRESENCE OF CRYSTALLINE ALUMINOSILICATES

[75] Inventor: Emmerson Bowes, Media, Pa.

[73] Assignee: Mobil Oil Corporation

[22] Filed: April 18, 1968

[21] Appl. No.: 722,206

[52] U.S. Cl. ........260/671 C, 260/672 R, 260/683.43
[51] Int. Cl. ..............................................C07c 3/52
[58] Field of Search............260/671, 671 C; 208/120

[56] References Cited

UNITED STATES PATENTS

| | | | |
|---|---|---|---|
| 3,251,897 | 5/1966 | Wise | 260/671 |
| 3,254,023 | 5/1966 | Miale et al | 208/120 |
| 3,370,099 | 2/1968 | Plank et al | 260/666 |
| 3,377,400 | 4/1968 | Wise | 260/668 |

*Primary Examiner*—Curtis R. Davis
*Attorney*—Oswald G. Hayes, Donald L. Dickerson, Raymond W. Barclay and James F. Woods

[57] ABSTRACT

A process for alkylating or dealkylating a compound capable of alkylation or dealkylation by contacting it in a reaction zone maintained under conditions effective for accomplishing said alkylation or dealkylation with a catalyst comprising a crystalline zeolite characterized by a unique X-ray diffraction pattern or products of thermal treatment of the zeolite. The zeolite can be further defined by reference to the following formula expressed in terms of mole ratios of oxides:

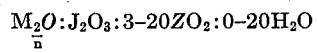

$$M_{\frac{2}{n}}O : J_2O_3 : 3-20 ZO_2 : 0-20 H_2O$$

wherein M is a cation, J is aluminum or gallium and Z is silicon or germanium and $n$ is the valence of M.

4 Claims, No Drawings

ALKYLATION AND DEALKYLATION OF AROMATICS IN THE PRESENCE OF CRYSTALLINE ALUMINOSILICATES

BACKGROUND OF THE INVENTION

1. Field of the Invention

This invention is directed to the alkylation of aromatic compounds with compounds having available alkyl groups wherein the alkylation is performed employing a new crystalline zeolite having superior aging properties.

This invention is also directed to the dealkylation of alkylated aromatic compounds employing the crystalline zeolite catalyst.

2. Discussion of the Prior Art

Heretofore it has been proposed to dealkylate an alkylated compound and/or alkylate an aromatic compound employing crystalline aluminosilicate catalysts. Unfortunately, while the aluminosilicate catalysts proposed provided initially satisfactory yields of desired products, the catalyst aging properties of these aluminosilicates were not sufficiently good enough to warrant employing these catalysts in any commercial unit. Specifically, faujasite or synthetic faujasite sometimes known as Linde Zeolite Y has been proposed for alkylation and/or dealkylation of aromatic compounds. However, this zeolite, for example in its rare earth exchanged form, loses activity after only a few hours on stream during continuous dealkylation particularly in the case of certain naphthalenes. A rare earth exchanged Linde Zeolite X, on the other hand, provides insufficient conversion to a dealkylated product to be considered for use in commercial operations. Hence, it is desired to provide a satisfactory process for alkylating or dealkylating aromatic compounds employing a zeolitic catalyst, heretofore lacking in the art.

SUMMARY OF THE INVENTION

Broadly, this invention contemplates a process for effecting alkylation or dealkylation of an alkylatable or dealkylatable compound under conditions effective for accomplishing said alkylation or dealkylation which comprises contacting said compound in a reaction zone with a catalyst comprising a crystalline zeolite characterized by the X-ray powder diffraction pattern of Table 1 or with products of thermal treatment of the zeolite whose X-ray diffraction powder pattern is that of Table 1. This new zeolite can also be represented by the general formula, expressed in terms of mole ratios of oxides, as follows:

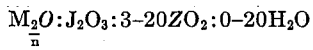
$$M_2O : J_2O_3 : 3\text{-}20 ZO_2 : 0\text{-}20 H_2O$$

wherein M is a cation, especially one selected from the group consisting of metals other than alkali metals, hydrogen, alkylammonium, arylammonium, products of thermal treatment of any of these forms, wherein $n$ is the valence of said cation, J is selected from the group consisting of aluminum and gallium and Z is selected from the group consisting of silicon and germanium. Preferably, the metal is one of Group II or Group VIII of the Periodic Table of which zinc and nickel are prime examples. Additionally, it is preferred that the zeolite is an alumino-silicate having a silica/alumina mole ratio between about 5 and 15.

The catalysts useful in this invention belong to the family of zeolites known as ZSM-4. These forms of the family of catalysts useful in the alkylation or dealkylation of the organic compounds are particularly durable and have great temperature stability. ZSM-4 compositions can be prepared in their sodium form and converted to a catalytically active form for alkylation or dealkylation. The composition has a distinctive X-ray diffraction pattern whose principal distinguishing lines are set forth in the table below. This table generally covers the various X-ray patterns for ZSM-4 compositions which patterns vary according to the particular cation or cations of the composition. Accordingly, the interplanar spacing values are given together with deviations to account for all cations.

TABLE 1

| Interplanar Spacing d(A) | Relative Intensity |
|---|---|
| 9.1 ± .2 | vs |
| 7.94 ± .1 | mw |
| 6.90 ± .1 | m |
| 5.97 ± .07 | s |
| 5.50 ± .05 | mw |
| 5.27 ± .05 | mw |
| 4.71 ± .05 | mw |
| 4.39 ± .05 | w |
| 3.96 ± .05 | w |
| 3.80 ± .05 | s |
| 3.71 ± .05 | m |
| 3.63 ± .05 | m |
| 3.52 ± .05 | s |
| 3.44 ± .05 | m |
| 3.16 ± .05 | s |
| 3.09 ± .05 | m |
| 3.04 ± .05 | m |
| 2.98 ± .05 | m |
| 2.92 ± .05 | s |

Standard techniques were employed to obtain the foregoing data. The radiation was the K-alpha doublet of copper, and a Geiger counter spectrometer with a strip chart pen recorder was used. The peak heights, I, and the positions as a function of two times theta, the Bragg angle, were read from the spectrometer chart. From these, the interplanar spacing in A., corresponding to the recorded lines, was calculated.

The family of catalysts useful for alkylation or dealkylation in accordance with this invention generally has an orthoxylene selectivity factor for its hydrogen form greater than 4 and generally at least about 6, although forms of the family of zeolites having a selectivity factor below 4 can satisfactorily be used, in some instances, for alkylation or dealkylation in accordance with this invention. The selectivity factor as used herein, designates the weight ratio of o-xylene isomerized to o-xylene disproportionated employing 200 ml of o-xylene which has been percolated with activated alumina at two volumes per volume per hour at 22 ± 3° C and introduced into a 1 liter steel shaker bomb containing 3.0 grams of zeolite which has been calcined, weighed out and after being weighed, dried at 900° F. for ½ hour, said bomb having been purged with nitrogen. The bomb is heated to 400° F. rapidly using an induction furnace while shaking at 200 RPM using an electric driven single cylinder Lawson engine for shaking the bomb. After 20 percent of the o-xylene is converted to conversion products, the bomb is water quenched, the shaking discontinued and the liquid sample analyzed. A complete description of apparatus to be used in determining the selectivity factor is disclosed in an article entitled "A New Laboratory Tool for Studying Thermal Processes" by J. W. Payne, C. W. Streed and E. R. Kent appearing in Industrial and Engineering Chemistry, Volume 50, pages 47–52 (1958). Such "-selectivity factor" distinguishes ZSM–4 from other zeolites, notably crystalline aluminosilicates, since the highest selectivity factor of previously known crystalline aluminosilicates has been approximately 3.7, generally much lower. Members of the ZSM–4 family on the other hand are uniquely characteristic by selectivity factors in excess of 4 and generally at least 6. Generally, the selectivity factor is between 6 and 15.

An aluminosilicate having a formula falling within the definition set forth above can be prepared by first forming a crystalline directing agent comprising sodium oxide, alumina, silica and water and having a composition in terms of mole ratios of oxides within the following ranges:

| | |
|---|---|
| $Na_2O/SiO_2$ | 1 to 4 |
| $SiO_2/Al_2O_3$ | 2 to 40 |
| $H_2O/Na_2O$ | 10 to 60 |

The crystallization directing agent is heated for between about 0.2 and 4 hours at between about 40° and 70° C. It is thereafter mixed with another solution containing sodium oxide, silica, and water and to the resulting mixture is added still another solution containing alumina and water to form a slurry. The resultant slurry is stirred and heated to between 20° and 120° C. for at least 0.5 to 1 hour. It is thereafter filtered and the resultant amorphous filter cake is treated with an aqueous solution containing tetramethylammonium hydroxide or other salt of the tetramethyl-ammonium radical, thereby forming a reaction mixture having composition, in terms of mole ratios of oxides, falling within the following ranges:

| | |
|---|---|
| $Na_2O/R_2O + Na_2O$ | 0.31 to <1 |
| $R_2O + Na_2O/SiO_2$ | .05 to .90 |
| $SiO_2/Al_2O_3$ | 3 to 60 |
| $H_2O/R_2O + Na_2O$ | 15 to 600 |
| R=Tetramethylammonium | |

That reaction mixture is heated to 20°–150° C. until crystals form. The crystals are filtered and washed with water until the washings have a pH of below 7. The product is thereafter dried. Thereafter the sodium form of the zeolite is converted to a catalytically active form by ion exchange.

To prepare the preferred form of the catalyst, the sodium form is thereafter treated with an ammonium compound such as ammonium hydroxide or ammonium chloride to exchange preferably at least about 90 percent of the sodium cations for ammonium. When the exchange is complete, the material is dried and calcined at a temperature of about 350° C. or higher up to about 800° C., whereby the ammonium radical decomposes with evolution of ammonia.

It should be stated that calcination of an ammonium form of a member of the family of zeolites useful in the present invention, in the presence of water provides a stable zeolite useful in catalyzing alkylation and dealkylation reactions in accordance with this invention. However, careful calcination in the absence of moisture produces a more active ZSM–4 zeolite which is useful in alkylation-dealkylation reactions.

The thermal treatment of the new zeolite, especially in a form wherein the cation is a metal other than sodium, hydrogen, ammonium, alkylammonium or arylammonium is performed at a temperature of at least 700° F for at least 1 minute and generally not longer than 20 hours. While subatmospheric pressure can be employed for the thermal treatment, atmospheric pressure is desired for reasons of convenience. It is preferred to perform the thermal treatment in the presence of moisture although moisture is not absolutely necessary. The thermal treatment can be performed at a temperature up to about 1,600° F at which temperature some decomposition begins to occur. The thermally treated product is particularly useful in the catalysis of certain hydrocarbon conversion reactions, such as alkylation and dealkylation pursuant to the present invention.

This invention further contemplates that the sodium cation can be replaced with other cations such as rare earth metals, e.g., lanthanum and the like. The non-sodium forms, preferably containing less than 4 percent by weight sodium, of the metal-containing aluminosilicates can be suitably prepared from the sodium form by a conventional replacement technique, involving the contacting of the crystalline sodium aluminosilicate zeolite with a solution of an ionizable compound of the ion which is to be exchanged into the crystalline structure for a sufficient time to bring about the extent of desired introduction of such ion. Repeated use of fresh solution of the entering ions is of value to secure more complete exchange. After such treatment, the resulting exchanged product is water washed, and dried and calcined.

As indicated above, the catalyst can be employed in its rare earth exchanged form or in the hydrogen form or in the modified high temperature calcination form discussed above. When employed for dealkylation of alkyl aromatics, the temperature is usually at least about 350° F. and ranges up to a temperature at which substantial cracking of charge stock of conversion products occurs, generally up to about 700° F. The temperature is preferably at least about 450° F. and no greater than the critical temperature of the compound undergoing dealkylation. Pressure is also employed to keep the aromatic feed in the liquid phase at the same time permitting continuous removal of dealkylated product. When the dealkylation is performed continuously in a reaction zone containing catalyst, the weight hourly space velocity is generally between about 0.1 and 50, preferably between about 0.5 and 5.

Exemplary of hydrocarbons which can be alkylated by the process of this invention are aromatic compounds such as benzenes, naphthalenes, anthracenes, and the like and substituted derivative thereof, alkyl substituted aromatics, for example, toluene, xylene, and homologs thereof. In addition, other substituent groups can be attached to the aromatic nucleus. These groups include by way of example: methyl, ethyl, tert.-butyl, and other alkyl substituents, cyclohexyl, methylcyclohexyl, cyclopentyl, and bicyclohexyl, other cyclic alkyl substituents, phenyl, naphthyl and other aromatic radicals.

The preferred alkylating agents are olefins such as ethylene, propylene, dodecylene, and alkyl halides, e.g., methyl chloride, alcohols and the like wherein the alkyl portion thereof has between one and 24 carbon atoms or more. It should be realized, however, that many other acyclic compounds having at least one available alkyl group can be used as an alkylating agent.

In alkylating an aromatic compound, it is desired that the aromatic compound first be charged into the reaction zone and allowed to substantially saturate the catalyst before the alkylating agent is introduced into the reactor. This obviates substantial polymerization and side chain reaction when the alkylating compound is introduced, especially in the case of low molecular weight olefins. Alkylation, in accordance with this invention, can be carried out at temperatures from 250° to 700° F. preferably about 450° F. At higher temperatures the alkylation reaction is not favored thermodynamically and olefins crack and form degradation products fouling the catalyst. Disproportionation reactions set in resulting in transfer of alkyl groups between product molecules to give polyalkyl compounds. Long chain alkyl groups attached to an aromatic ring or other cyclic hydrocarbons are shortened by this degradation to form more alkyl substituents. Additionally, tarry residues are formed due to the degradation reactions. The inadvertent preparation of resins together with tarry degradation products leads to the formation of coke like deposits on the active surface of the ZSM-4 catalyst. As a result, after some time, the properties of the catalyst will be impaired. Hence, normally unnecessary or frequent regeneration will be required.

If desired, for either the alkyation or dealkylation, the zeolite catalyst can be employed in combination with a support or binder such as a porous inorganic oxide support or a clay binder. Such materials include, by way of example, dried inorganic oxide gels and gelatinous precipitates of alumina, zirconia, silica, magnesia, thoria, titania, boria, and combinations of these. Suitable clay materials include bentonite and kieselguhr.

As indicated above, the "as synthesized" form of the ZSM-4 catalyst is normally the sodium form. Preferably, at least the zeolite contains less than 4 percent by weight sodium and most preferably less than 1 percent by weight sodium. In preparing the rare earth exchanged forms of the catalyst composition, the aluminosilicate can be contacted with a non-aqueous or aqueous fluid medium comprising a polar solvent or aqueous solution containing the desired rare earth metal salt to accomplish exchange of the rare earth metal for the sodium ions. Naturally, the rare earth metal salt must be soluble in the fluid medium. In view of the nature of the rare earth metal salts, an aqueous solution is preferred to accomplish the exchange.

Introduction of hydrogen ions can be effected by contacting the ZSM-4 aluminosilicate with an ammonium-containing medium, such as an ammonium salt solution which serves to exchange into the aluminosilicate ammonium ions which upon subsequent heating at 250° to 400° C. are converted to the hydrogen form. The ZSM-4 aluminosilicates of high silica content, such as above 7:1 can be treated directly without adverse affect with an acid, e.g., hydrochloric acid. Water is the preferred medium for reasons of economy and ease of preparation in large scale operations involving continuous or batchwise treatment. Similarly, for this reason, organic solvents are less preferred, but can be employed. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide and the like.

Generally speaking, an active ZSM-4 composition can be prepared by exchanging its sodium form for any metal especially those of Group II and Group VIII of the Periodic Table, manganese and rare earth metals. Zinc and nickel are prime examples of Group II and Group VIII metals respectively.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, yttrium (as $Y_2O_3$) 0.2 percent by weight, and other rare earth oxides 0.8 percent by weight. Didymium chloride is also a mixture of rare earth chlorides, but having a low cerium content. It consists of the following rare earths determined as oxides: lanthanum, 56–46 percent by weight; cerium, 1–2 percent by weight; praseodymium, 9–10 percent by weight; neodymium, 32–33 percent by weight; samarium, 5–7 percent by weight; gadolinium, 3–4 percent by weight; yttrium, 0.4 percent by weight; other rare earths 1–2 percent by weight. It is to be understood that other mixtures of rare earths are equally applicable in the instant invention.

In order to more fully illustrate the invention and the manner of practicing the same, the following examples are presented.

EXAMPLE 1

A ZSM-4 composition having silica:alumina mole ratio of about 7.7 was prepared by preparing the following solutions:

| | |
|---|---:|
| Solution 1 (Crystallization Directing Agent) | |
| 37.3% Aqueous sodium silicate solution | 302.7 g. |
| Sodium aluminate (30.2%, $Na_2O$, 43.5% $Al_2O_3$) | 21.1 g. |
| 97.3% Aqueous sodium hydroxide | 169.8 g. |
| Water | 673.2 g. |
| Solution 2 | |
| 37.3% Aqueous sodium silicate solution | 1188.0 g. |
| Solution 3 | |
| $Al_2(SO_4)_3 \cdot 14\ H_2O$ | 209.0 grams |
| Water | 960.0 grams |
| 96.5% $H_2SO_4$ | 176.0 grams |
| Solution 4 | |
| Tetramethylammonium hydroxide 24% in methanol | 665.5 grams |

Solutions 1 and 2 were mixed together in a 1 gallon Waring Blender. Solution 3 was added thereto followed by Solution 4. The final slurry was mixed for another 2-3 minutes in the blender. The contents were placed in a polypropylene bottle which was then heated to 100° C. After 30 hours in the bottle, the crystalline product was washed and dried. The dried product analyzed as follows: 1.07 percent $N_2$, 6.24 percent Na, 16.6 percent $Al_2O_3$, 74.7 percent $SiO_2$ indicating an oxide mole ratio 0.23 $[(CH_3)4N]_2O : 0.83\ Na_2O:Al_2O_3$: 7.7 $SiO_2$.

The major portion of the sodium content was exchanged for ammonium cations in the usual manner by contacting the material with an aqueous solution of ammonium chloride. The exchanged form was thereafter calcined to convert the NH4 ZSM-4 to HZSM-4.

The ZSM-4 catalyst had the X-ray diffraction pattern values shown in Table 1 above which include peaks which are characteristic of ZSM-4 catalysts.

Another ZSM-4 catalyst having silica to alumina mole ratio of 13:1 was prepared by preparing the following solutions in the amounts specified:

1. Crystallization Directing Agent (CDA)
    Q-brand Sodium Silicate (8.9% $Na_2O$, 28.9% $SiO_2$, 62.2% water)    309.60 grams
    Na Aluminate    21.60 grams
    NaOH (97.4%)    173.70 grams
    $H_2O$    688.80 grams
2. Sodium Silicate Solution
    Q-brand    1215.00 grams
3. Alum Solution
    $Al_2(SO_4)_3.14\ H_2O$    213.78 grams
    $H_2SO_4$ (96.5%)    248.40 grams
    $H_2O$    1080.00 grams
4. Tetramethylammonium Hydroxide
    (24% by weight in methanol)    318.00 grams The CDA solution was prepared by dissolving the sodium hydroxide in water and adding sodium aluminate and sodium silicate solution thereto and heating the resultant solution at 60° C. for ½ hour. The sodium silicate solution (2) was introduced into a Waring Blender having a gallon capacity. A powerstat which regulates the mixing speed was turned on at a low speed. The CDA solution (1) was added thereto and thereafter the alum solution (3) was added. Mixing continued with the aid of a spatula. The tetramethylammonium hydroxide solution (4) was then introduced into the Waring Blender and the solutions were blended until a smooth paste was obtained. The paste was poured into two, two-quart jars, sealed and placed into a 100° C. steam box. After 34 days ZSM-4 crystals were obtained. The product had a silica/alumina mole ratio of 13:1. It had the characteristic X-ray diffraction pattern of ZSM-4 as set forth in Table 1 above.

The crystals were separated from the supernatant liquid and a 300 gram portion of the same was dried. It was placed in a vessel. Over it was placed four successive solutions of 20 weight percent ammonium sulfate at 210° F., the total amount of ammonium sulfate passed over the same being about 3,000 ml. The product was water washed free of sulfate ions with about 5 liters of water and dried at 120° C. overnight in an oven. This procedure exchanged most of the sodium ions in the ZSM-4 for ammonium ions, thereby reducing the sodium content to 0.34 percent. The product was thereafter pelleted, crushed, and calcined in an oven at atmospheric pressure at 1,000° F. and converted to the hydrogen form.

For purposes of comparison, a rare earth exchanged Linde Zeolite Y catalyst and a rare earth exchanged zeolite Linde X catalyst was also prepared in addition to a hydrogen form of mordenite.

These five aluminosilicates were compared for ability to dealkylate nonyl naphthalene at a temperature of about 550° F. (290° C.) at pressures just sufficient to keep the continuous nonyl naphthalene feed in the liquid phase. The Table below reports the conversion of dealkylate in grams product per gram catalyst over the period of time of reaction as set forth below:

TABLE 2

Dealkylation of Nonyl Naphthalene at 550° F. (290° C.) Conversion in g product/g catalyst

| Catalyst | Reaction Time, Hours | | | |
|---|---|---|---|---|
| | 1 | 2 | 3 | 5 |
| HZSM-4 7.7:1 silica/alumina (.21 wt. % Na) | 24 | 43 | 54 | 63 |
| HZSM-4 13:1 silica/alumina | 22 | 34 | 41 | 51 |
| REY (1.3 wt. % Na) | 19 | 24 | 26 | 29 |
| REX (0.5 wt. % Na) | | 9 | | |
| Hydrogen Mordenite (<.1 wt. % Na) | 0.5 | | | |

From the above it can easily be seen that the HZSM-4 catalyst provides superior results for effecting dealkylation both in terms of initial conversion and catalyst aging properties.

EXAMPLE 2

Into a reaction zone maintained at atmospheric pressure were charged benzene and ethylene in vapor phase. The reaction zone contained a ZSM-4 catalyst in hydrogen form having a silica: alumina mole ratio of 13:1. The temperature of the benzene and ethylene was 350° F. The benzene to ethylene ratio was 12:1 (molar). The effluent was condensed and liquid product was separated from unconverted ethylene.

A liquid sample collected over a 30 minute period on stream was analyzed and found to contain 2.8 percent weight ethylbenzene and 97.2 percent weight benzene. The ethylbenzene produced represents a conversion of 17 percent of the ethylene charge.

This example shows the high activity of a hydrogen form of ZSM-4 catalyst for aromatic alkylation even to the extent that alkylate is produced under vapor phase conditions at atmospheric pressure.

EXAMPLE 3

Into a shaker bomb as described above were charged 23 grams n-nonene and 90 grams naphthalene. Into the bomb there was placed 3.0 grams of HZSM-4 catalyst having a silica/alumina mole ratio of about 7:1. The temperature was raised to 450° F. After 5 hours 90 weight percent of the n-nonene had been consumed to form nonyl naphthalene.

Another portion of 23 grams was added to the mixture and shaken for another 5 hours at about 450° F. Analysis showed 90 percent of n-nonene was consumed to form nonyl naphthalene. No dialkylated products were found.

EXAMPLE 4

A mixture of benzene 65 percent by weight and n-dodecene 35 percent by weight were feed into a reactor containing 25 cc of HZSM–4 containing 25 percent by weight alumina binder in the form of 22 × 40 mesh extrudates. The HZSM–4 had a silica/alumina mole ratio of about 7.7:1. The temperature was raised to 450° F and a pressure of 550 psig applied to maintain the charge in the liquid phase. At a flow rate of 0.25 LHSV, approximately the theoretical amount of benzene was consumed to form alkyl benzenes of which about 80 weight percent was dodecylbenzene. After 91 hours on stream the the product analyzed:

| | |
|---|---|
| Lighter than benzene | 3.1% |
| Benzene | 53.1% |
| Alkyl benzenes | 43.6% |

The terms and expressions used herein have been used as terms of illustration and not of limitation, as there is no intention, in the use of such terms and expressions, of excluding any equivalents, or portions thereof, as many modifications and departures are contemplated within the scope of the invention claimed. For instance, as indicated above in the general formula for applicable zeolites, instead of employing an aluminum oxide, one can employ a gallium oxide and instead of employing a silicon oxide, one can employ a germanium oxide. The resultant zeolite falls within the scope of the appended claims and can be converted to a catalytically active form by ion exchange as can alumino-silicates useful in accordance with this invention. These other zeolites are similarly useful in alkylation-dealkylation in accordance with the process of this invention.

What is claimed is:

1. A process for alkylating benzene which comprises contacting the same with ethylene at atmospheric pressure and a temperature of approximately 350° F. in the presence of a catalyst consisting essentially of a crystalline aluminosilicate zeolite characterized by the X-ray diffraction lines of Table 1 and a composition, expressed in terms of mole ratios of oxides as follows:

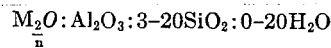

$$\frac{M_2O}{n} : Al_2O_3 : 3\text{--}20SiO_2 : 0\text{--}20H_2O$$

wherein M is predominately hydrogen and $n$ is the valence of M.

2. A process according to claim 1 wherein said catalyst is HZSM–4 characterized by a silica/alumina mole ratio between about 5 and 15.

3. A process according to claim 1 wherein said catalyst is employed in combination with a support or binder.

4. A process according to claim 1 wherein said support or binder is alumina.

* * * * *